US011758565B2

(12) United States Patent
Taherzadeh Boroujeni et al.

(10) Patent No.: US 11,758,565 B2
(45) Date of Patent: Sep. 12, 2023

(54) SELECTION OF TRANSMISSION PARAMETERS FOR A MAXIMUM PERMISSIBLE EXPOSURE EVENT

(71) Applicant: QUALCOMM Incorporated, San Diego, CA (US)

(72) Inventors: Mahmoud Taherzadeh Boroujeni, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/217,579

(22) Filed: Mar. 30, 2021

(65) Prior Publication Data

US 2021/0314952 A1    Oct. 7, 2021

Related U.S. Application Data

(60) Provisional application No. 63/004,156, filed on Apr. 2, 2020.

(51) Int. Cl.
*H04W 72/53*    (2023.01)
*H04L 5/00*    (2006.01)
*H04W 72/0446*    (2023.01)
*H04W 72/044*    (2023.01)
*H04W 72/21*    (2023.01)

(52) U.S. Cl.
CPC ........... *H04W 72/53* (2023.01); *H04L 5/0051* (2013.01); *H04W 72/0446* (2013.01); *H04W 72/0473* (2013.01); *H04W 72/21* (2023.01)

(58) Field of Classification Search
CPC ............. H04W 72/53; H04W 72/0446; H04W 72/0473; H04W 72/21; H04L 5/0051; H04L 5/0091
See application file for complete search history.

(56) References Cited

U.S. PATENT DOCUMENTS

| | | | |
|---|---|---|---|
| 2014/0171141 A1* | 6/2014 | Niskala | H04W 52/288 455/522 |
| 2018/0278318 A1* | 9/2018 | Chakraborty | H04B 7/0404 |
| 2018/0368081 A1* | 12/2018 | Akkarakaran | H04W 52/365 |
| 2022/0006507 A1* | 1/2022 | Guan | H04B 7/0695 |
| 2022/0264481 A1* | 8/2022 | Caporal Del Barrio | H04W 52/146 |

* cited by examiner

*Primary Examiner* — Rina C Pancholi
(74) *Attorney, Agent, or Firm* — Harrity & Harrity, LLP

(57) ABSTRACT

Various aspects of the present disclosure generally relate to wireless communication. In some aspects, a user equipment may receive an indication of first values for a set of transmission parameters for an uplink transmission; and transmit, based at least in part on identifying a maximum permissible exposure event, the uplink transmission based at least in part on second values for the set of transmission parameters, wherein the second values are different from the first values for at least one modulation parameter of the set of transmission parameters. Numerous other aspects are provided.

30 Claims, 6 Drawing Sheets

SELECTION OF TRANSMISSION PARAMETERS FOR A MAXIMUM PERMISSIBLE EXPOSURE EVENT

CROSS-REFERENCE TO RELATED APPLICATION

This patent application claims priority Provisional Patent Application No. 63/004,156, filed on Apr. 2, 2020, entitled "SELECTION OF TRANSMISSION PARAMETERS FOR A MAXIMUM PERMISSIBLE EXPOSURE EVENT," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for selection of transmission parameters for a maximum permissible exposure event.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include receiving an indication of first values for a set of transmission parameters for an uplink transmission; and transmitting, based at least in part on identifying a maximum permissible exposure (MPE) event, the uplink transmission based at least in part on second values for the set of transmission parameters, wherein the second values are different from the first values for at least one modulation parameter of the set of transmission parameters.

In some aspects, a method of wireless communication, performed by a base station, may include transmitting an indication of first values for a set of transmission parameters for an uplink transmission from a UE; and receiving, based at least in part on the UE identifying an MPE event, the uplink transmission based at least in part on second values for the set of transmission parameters, wherein the second values are different from the first values for at least one modulation parameter of the set of transmission parameters.

In some aspects, a UE for wireless communication may include a memory and one or more processors operatively coupled to the memory. The memory and the one or more processors may be configured to receive an indication of first values for a set of transmission parameters for an uplink transmission; and transmit, based at least in part on identifying an MPE event, the uplink transmission based at least in part on second values for the set of transmission parameters, wherein the second values are different from the first values for at least one modulation parameter of the set of transmission parameters.

In some aspects, a base station for wireless communication may include a memory and one or more processors operatively coupled to the memory. The memory and the one or more processors may be configured to transmit an indication of first values for a set of transmission parameters for an uplink transmission from a UE; and receive, based at least in part on the UE identifying an MPE event, the uplink transmission based at least in part on second values for the set of transmission parameters, wherein the second values are different from the first values for at least one modulation parameter of the set of transmission parameters.

In some aspects, a non-transitory computer-readable medium may store one or more instructions for wireless communication. The one or more instructions, when executed by one or more processors of a UE, may cause the one or more processors to receive an indication of first values for a set of transmission parameters for an uplink transmission; and transmit, based at least in part on identifying an MPE event, the uplink transmission based at least in part on second values for the set of transmission parameters, wherein the second values are different from the first values for at least one modulation parameter of the set of transmission parameters.

In some aspects, a non-transitory computer-readable medium may store one or more instructions for wireless communication. The one or more instructions, when executed by one or more processors of a base station, may cause the one or more processors to transmit an indication of first values for a set of transmission parameters for an uplink transmission from a UE; and receive, based at least in part on the UE identifying an MPE event, the uplink transmission based at least in part on second values for the set of transmission parameters, wherein the second values are different from the first values for at least one modulation parameter of the set of transmission parameters.

In some aspects, an apparatus for wireless communication may include means for receiving an indication of first values for a set of transmission parameters for an uplink transmission; and means for transmitting, based at least in part on identifying an MPE event, the uplink transmission based at least in part on second values for the set of transmission parameters, wherein the second values are different from the first values for at least one modulation parameter of the set of transmission parameters.

In some aspects, an apparatus for wireless communication may include means for transmitting an indication of first values for a set of transmission parameters for an uplink transmission from a UE; and means for receiving, based at least in part on the UE identifying an MPE event, the uplink transmission based at least in part on second values for the set of transmission parameters, wherein the second values are different from the first values for at least one modulation parameter of the set of transmission parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
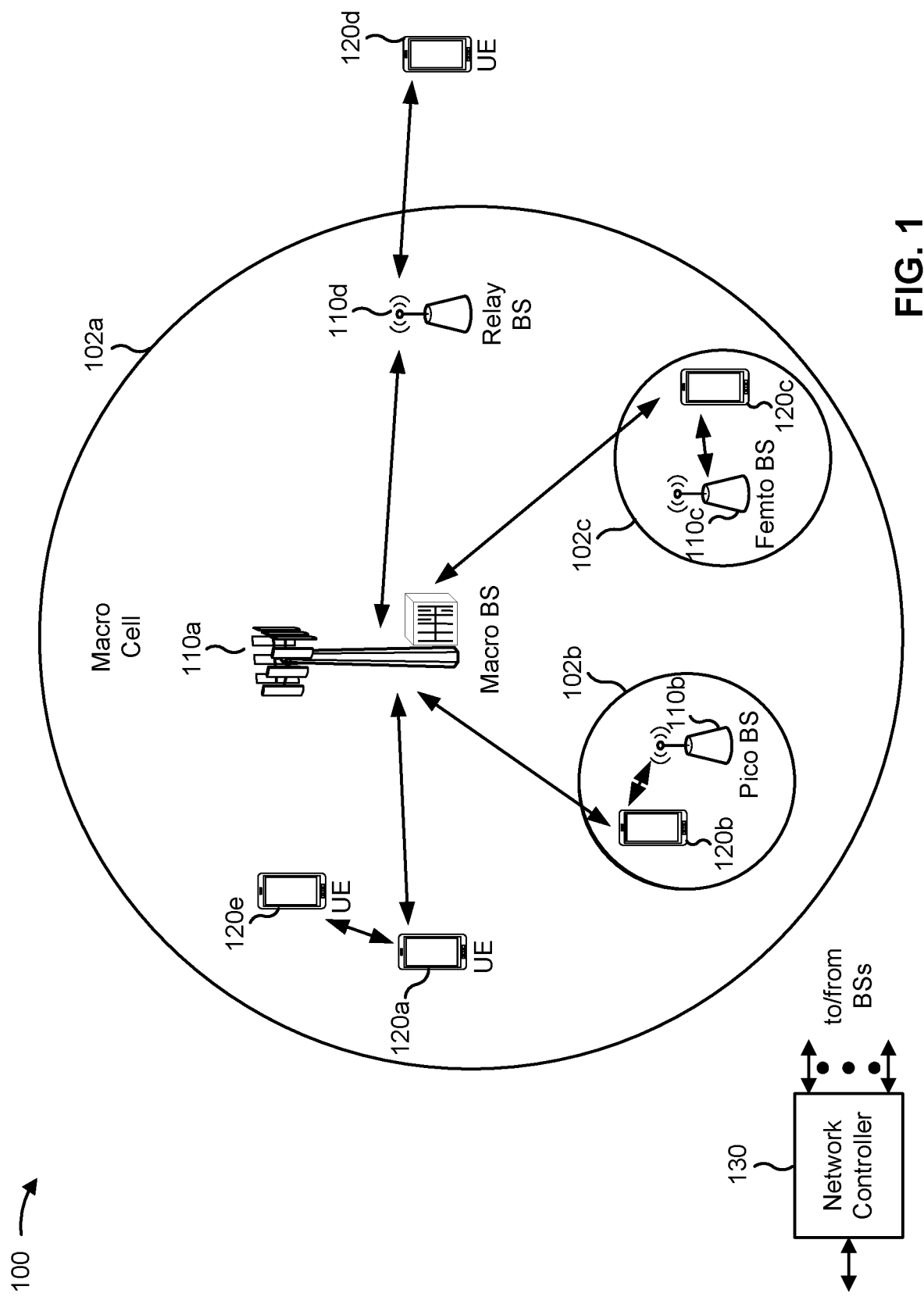
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
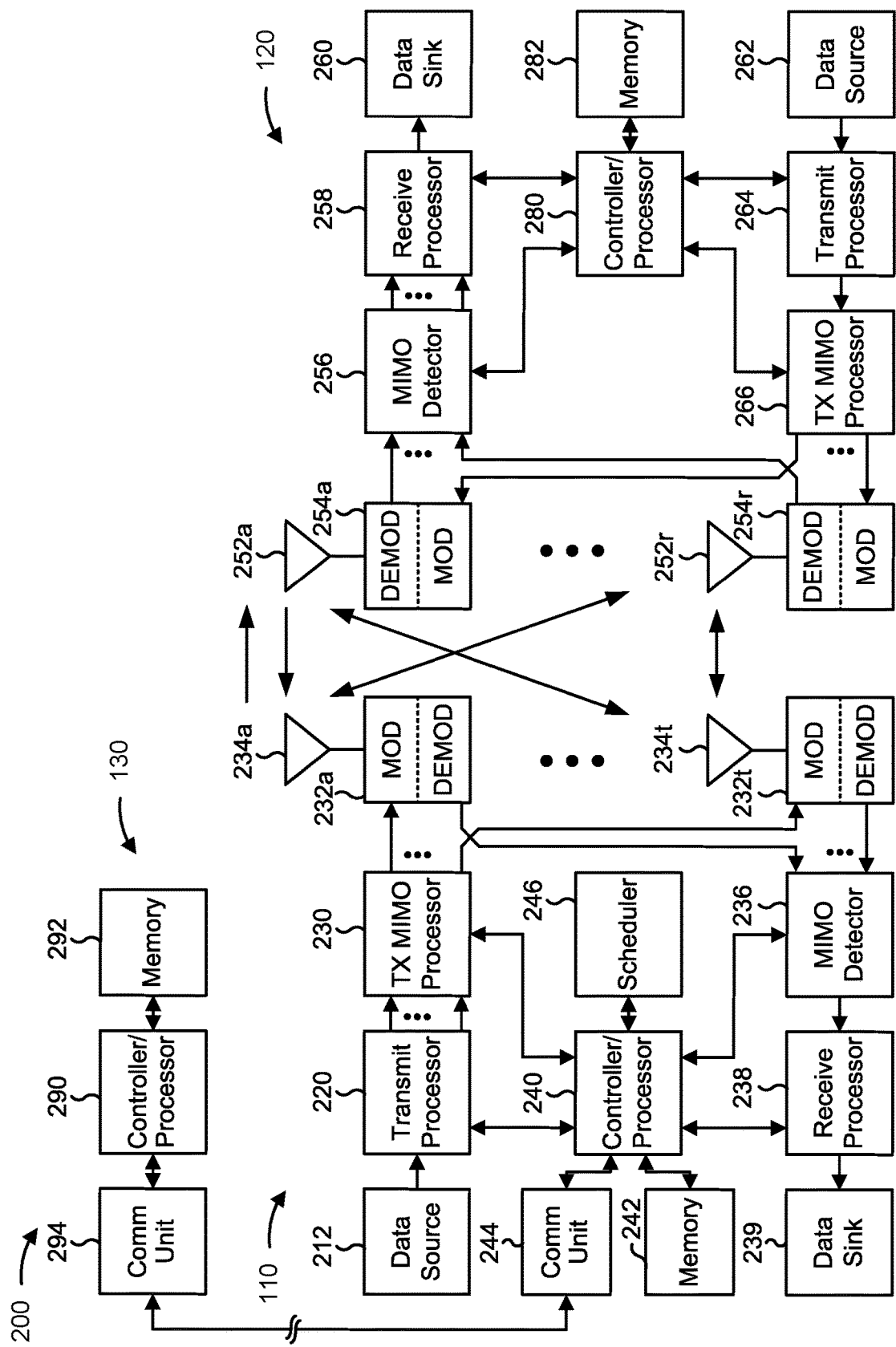
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving an indication of first values for a set of transmission parameters for an uplink transmission; means for transmitting, based at least in part on identifying an MPE event, the uplink transmission based at least in part on second values for the set of transmission parameters, wherein the second values are different from the first values for at least one modulation parameter of the set of transmission parameters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication of first values for a set of transmission parameters for an uplink transmission from a UE; means for receiving, based at least in part on the UE identifying an MPE event, the uplink transmission based at least in part on second values for the set of transmission parameters, wherein the second values are different from the first values for at least one modulation parameter of the set of transmission parameters; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
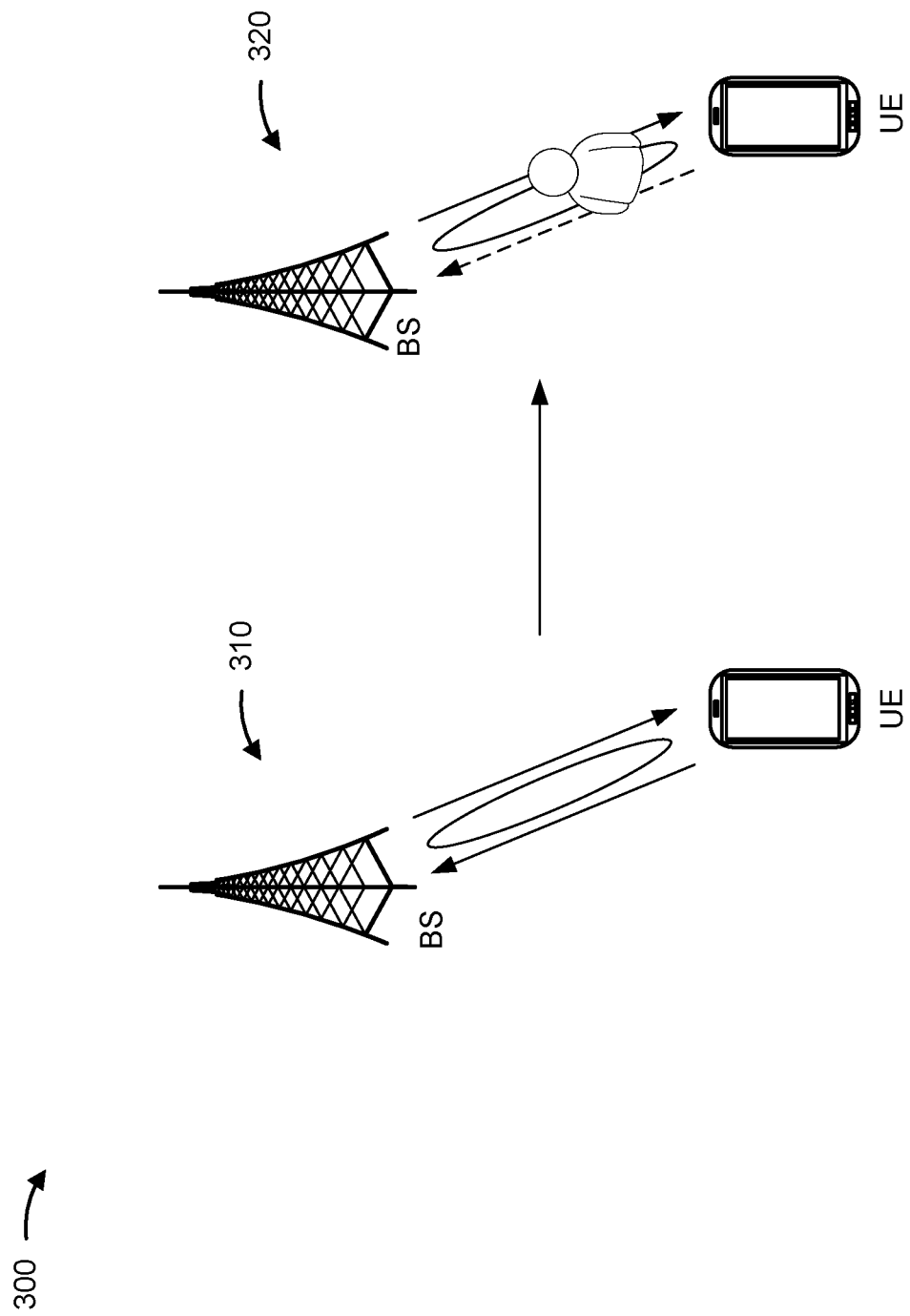
FIG. 3 is a diagram illustrating an example of identifying an MPE event, in accordance with the present disclosure.

FIG. 3 is a diagram illustrating an example 300 of identifying an MPE event, in accordance with the present disclosure.

As shown in FIG. 3, and by reference number 310, a UE and a base station may communicate using directional beams. In some wireless networks, a UE may communicate with a base station using directional beamforming to boost transmission power in one or more particular directions associated with one or more beams. By concentrating transmission power in one or more beams, an output energy associated with transmissions using the one or beams may be higher than if the UE performed an omni-directional transmission for the transmissions. This may increase a range of the transmissions, but may also cause an energy density of the transmission to satisfy (e.g., exceed) an MPE value that defines a highest average energy density that is allowed to be exposed to a human body at close range. An MPE value may be defined via radio resource control (RRC) configurations, for example, to comply with a standard and/or a regulation. The standard and/or regulation may have different limits for different frequency bandwidths. For example, a limit (e.g., corresponding to the MPE value) may be lower for millimeter wave (mmWave) transmissions than for sub-6 wave transmissions.

As shown by reference number 320, the UE may identify an MPE event. The UE may identify the MPE event based at least in part on detecting a part of a human body and/or other organic material at close range of the UE within a path of an uplink beam. Based at least in part on detecting a part of a human body in a direction of a beam for which uplink transmissions would use an energy density that satisfies the MPE, the UE may reduce transmission power of one or more antennas that are associated with the beam. However, by reducing transmission power of the one or more antennas that are associated with the beam, the transmission may have insufficient power for the base station to receive the transmission based at least in part on uplink parameters that were based at least in part on conditions before the MPE event.

This may cause a failure to receive the uplink transmissions. The base station and the UE may consume computing, communication, and network resources to detect and recover from the failed uplink transmissions.

As indicated above, FIG. 3 is provided as an example. Other examples may differ from what is described with regard to FIG. 3.

In some aspects described herein, a UE may be configured with secondary (e.g., backup, alternative, and/or the like) values for a set of transmission parameters to use based at least in part on identifying an MPE event. The set of transmission parameters may include one or more modulation and/or coding parameters (a modulation and coding scheme (MCS) for an uplink transmission, a demodulation reference signal (DMRS) pattern for the uplink transmission, a DMRS bundling configuration for the uplink transmission), a slot aggregation configuration for the uplink transmission, time and frequency allocations of resources, instantaneous power for the uplink transmission, and/or the like.

In some aspects, a UE may receive (e.g., from a base station) an indication of first values for the transmission parameters to use for the set of transmission parameters for an uplink transmission (e.g., a dynamically scheduled uplink transmission, a configured uplink transmission (e.g., a semi-persistent scheduling (SPS) based uplink transmission), and/or the like). The UE may identify an MPE event that may require the UE to reduce a transmission power for the uplink transmission. Based at least in part on identifying the MPE event, the UE may transmit the uplink transmission based at least in part on second values (e.g., the secondary values) for the set of transmission parameters. In other words, the UE may replace the first values with the second values based at least in part on identifying the MPE event.

By replacing the first values (e.g., determined based at least in part on an absence of the MPE event) with the second values (e.g., determined for use based at least in part on a presence of the MPE event), the UE may transmit the uplink transmission with values for the transmission parameters that may increase a likelihood of reception by the base station. In this way, the UE and the base station may conserve computing, communication, and/or network resources that may otherwise be used to detect and recover from failed uplink transmissions.

Figure 4:
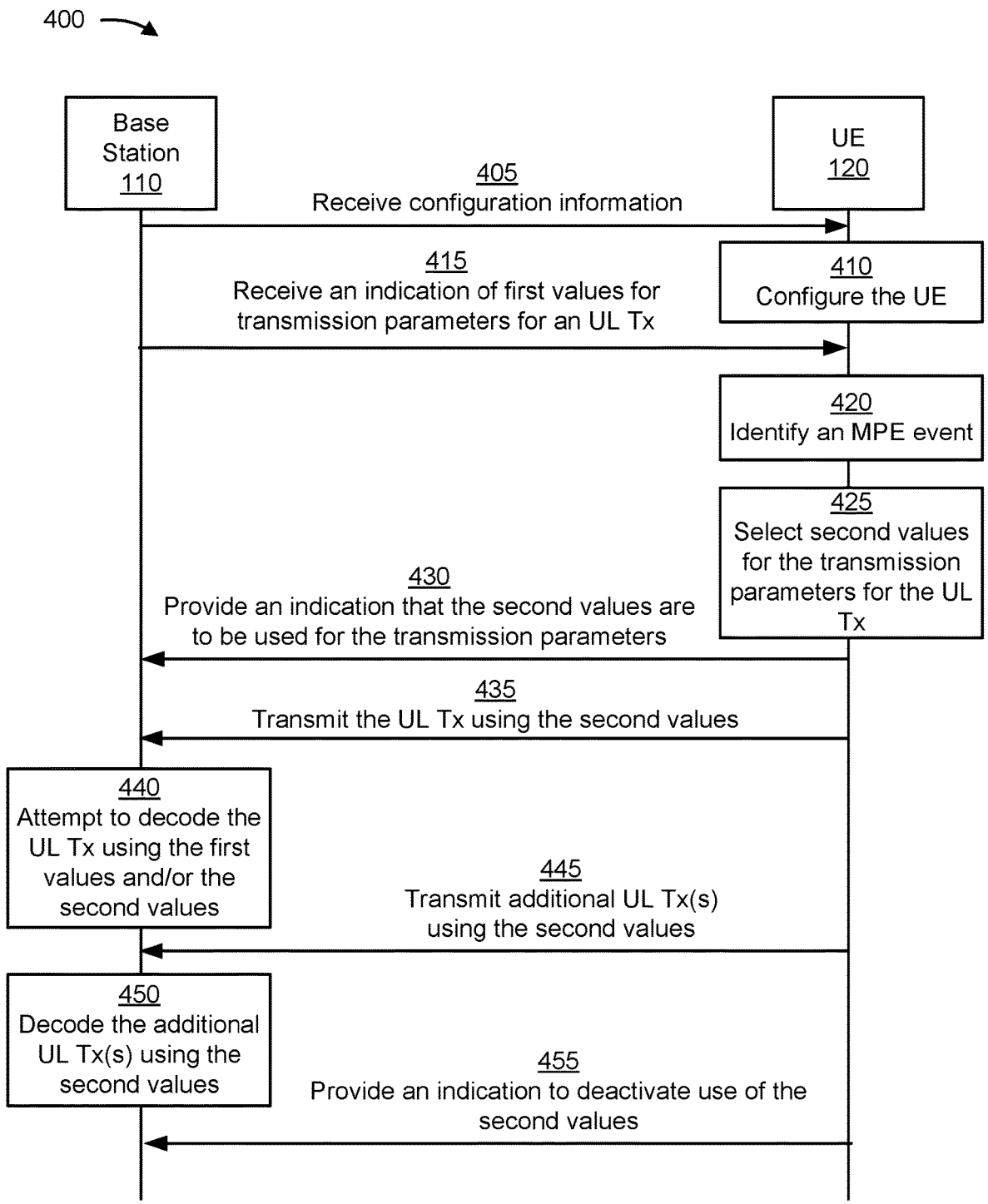
FIG. 4 is a diagram illustrating an example of selection of transmission parameters for an MPE event, in accordance with the present disclosure.

FIG. 4 is a diagram illustrating an example 400 of selection of transmission parameters for an MPE event, in accordance with the present disclosure. As shown in FIG. 4, a UE (e.g., UE 120) may communicate with a base station (e.g., base station 110). The UE and the base station may be part of a wireless network (e.g., wireless network 100).

As shown by reference number 405, the UE may receive configuration information (e.g., from the base station, another base station, another UE, and/or the like). In some aspects, the UE may receive the configuration information via one or more of RRC signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to be configured to use second values for a set of transmission parameters based at least in part on identifying an MPE event. The second values may be different from the first values for at least one modulation parameter of the set of transmission parameters. In some aspects, the configuration information may include the second values. In some aspects, the configuration information may indicate that the UE is to use second values that are provided, or are to be provided, in another communication (e.g., a downlink control information (DCI) message, additional RRC signaling, MAC CEs, and/or the like). In some aspects, the configuration information may indicate that the UE is to derive second values from information provided in the configuration information or to be provided in another communication (e.g., a DCI message, additional RRC signaling, MAC CEs, and/or the like).

In some aspects, the configuration information may indicate that the UE is to provide an indication that the second values are to be used for the set of transmission parameters. In some aspects, the configuration information may indicate a type of message that the UE is to use to provide the indication that the second values are to be used for the set of transmission parameters. For example, the configuration information may indicate that the UE is to provide the indication that the second values are to be used for the set of transmission parameters via an uplink control information (UCI) message via a physical uplink control channel (PUCCH), a UCI message via a physical uplink shared channel (PUSCH), one or more MAC CEs, a power headroom report, and/or the like.

In some aspects, the configuration information may include scheduling information for a configured grant (e.g., a grant of SPS resources). In some aspects, the scheduling information may indicate one or more conditions to deactivate the indication that the second values are to be used for the set of transmission parameters. For example, the one or more conditions may include an expiration of a configured amount of time, transmission (e.g., by the UE or the base station) of an indication to deactivate the indication that the second values are to be used for the set of transmission parameters, and/or the like.

As shown by reference number 410, the UE may configure the UE for communicating with the base station. In some aspects, the UE may configure the UE based at least in part on the configuration information. In some aspects, the UE may configure a response to identifying an MPE event when an uplink transmission is already scheduled with first values for the set of transmission parameters that are based at least in part on an absence of the MPE event. In some aspects, the UE may be configured to perform one or more operations described herein.

As shown by reference number 415, the UE may receive an indication of first values for the set of transmission parameters for an uplink transmission. In some aspects, the set of transmission parameters may include one or more modulation and/or coding parameters (an MCS for an uplink transmission, a DMRS pattern (e.g., locations of DMRSs, densities of DMRSs, and/or the like) for the uplink transmission, a DMRS bundling configuration (e.g., a configuration to use DMRSs over multiple slots for channel estimation) for the uplink transmission), a slot aggregation configuration (e.g., a number of slots for transmitting a transport block (e.g., based at least in part on modifying an MCS and/or a data rate of the uplink transmission)) for the uplink transmission, time and frequency allocations of resources, instantaneous power for the uplink transmission, and/or the like.

In some aspects, the UE may receive (e.g., and the base station may transmit), in a single message (e.g., an RRC message, a DCI message, and/or the like), the indication of the first values, an indication to use the second values for the set of transmission parameters based at least in part on identifying an MPE event, a request to provide an indication (e.g., based at least in part on identifying an MPE event) that the second values are to be used for the set of transmission parameters, a configured amount of time after which an indication that the second values are to be used is deactivated, and/or the like. In some aspects, the UE may receive, in multiple messages, the indication of the first values, an indication to use the second values for the set of transmission parameters based at least in part on identifying an MPE event, the request to provide an indication that the second values are to be used for the set of transmission parameters, a configured amount of time after which an indication that the second values are to be used is deactivated, and/or the like.

As shown by reference number 420, the UE may identify an MPE event. For example, the UE may detect that a part of a human body and/or other organic material is at close range for the UE (e.g., within a threshold distance of the UE) within a path of an uplink beam associated with the uplink transmission. In some aspects, the UE may determine to reduce a transmission power for the uplink transmission based at least in part on the MPE event.

As shown by reference number 425, the UE may select the second values for the transmission parameters for the uplink transmission based at least in part on identifying the MPE event. The second values may be different from the first values for at least one modulation parameter of the set of transmission parameters. The UE may select the second values based at least in part on an identification of the second values within configuration information, a same communication that includes the indication of the first values, a communication that is separate from the indication of the first values, and/or the like. In some aspects, the UE may select the second values based at least in part on an indication to select the second values from a set of candidate values that were previously received by the UE. In some aspects, the UE may derive the second values based at least in part on information received by the UE.

In some aspects, the UE may determine whether to use the second values or to use the first values based at least in part on one or more additional parameters, such as a reference signal receive power (RSRP), a power headroom, and/or the like reported by the base station. In other words, the UE may determine to use the first values based at least in part on a transmission power remaining sufficient, even with a reduction based at least in part on identifying the MPE event, for the base station to receive the uplink transmission based at least in part on the first values for the set of transmission parameters (e.g., based at least in part on a sufficiently high RSRP, power headroom, and/or the like).

As shown by reference number 430, the UE may provide (e.g., to the base station) an indication that the second values are to be used for the set of transmission parameters. In some aspects, the UE may provide the indication that the second values are to be used for the set of transmission parameters for the uplink transmission based at least in part on a request to provide the indication, a configuration to provide the indication, and/or the like. In some aspects, the UE may transmit the indication that the second values are to be used for the set of transmission parameters via a UCI message via a PUCCH, a UCI message via a PUSCH, a MAC CE, a power headroom report, and/or the like.

In some aspects, a regulation and/or standard associated with MPE may indicate a maximum average transmission power over a period of time. In some aspects, the UE may transmit the indication that the second values are to be used for the set of transmission parameters with a relatively high transmission power and may transmit the uplink transmission and/or additional transmissions with a relatively low transmission power to satisfy the maximum average transmission power of the period of time. In this way, the UE may transmit, with a sufficient transmission power (e.g., for the base station to receive based at least in part on the first values), the indication that the second values are to be used for the set of transmission parameters.

As shown by reference number 435, the UE may transmit the uplink transmission based at least in part on the second values. In other words, the UE may transmit, based at least in part on identifying the MPE event, the uplink transmission based at least in part on the second values for the set of transmission parameters.

As shown by reference number 440, the base station may attempt to decode the uplink transmission based at least in part on the first values and/or the second values. In some aspects (e.g., based at least in part on receiving the indication that the second values are to be used for the set of transmission parameters), the base station may attempt to decode the uplink transmission based at least in part on the second values. In some aspects, the base station may continue to use the first values to attempt to decode uplink transmission for a period of time after receiving the indication that the second values are to be used for the set of transmission parameters. In some aspects, the period of time may be a configured amount of time, an amount of time indicated in the indication, and/or the like.

In some aspects (e.g., based at least in part on not receiving the indication that the second values are to be used for the set of transmission parameters), the base station may attempt to decode the uplink transmission based at least in part on the first values and the second values. In some aspects, the base station may attempt to decode the uplink transmission based at least in part on the first values in parallel with attempting to decode the uplink transmission based at least in part on the second values. In some aspects, the base station may attempt to decode the uplink transmission based at least in part on the second values after failing to decode the uplink transmission based at least in part on the first values.

As shown by reference number 445, the UE may transmit one or more additional uplink transmissions based at least in part on the second values. In some aspects, the UE may transmit the one or more additional uplink transmissions based at least in part on the second values for a period of time, and then may revert back to transmitting uplink transmissions based at least in part on the first values. In some aspects, the UE may transmit the one or more additional uplink transmissions based at least in part on the second values until the UE (e.g., based at least in part on no longer detecting the MPE event) or the base station (e.g., based at least in part on detecting an RSRP, power headroom, and/or the like that is sufficiently high to use the first values) transmits an indication to deactivate the indication that the second values are to be used for the set of transmission parameters.

As shown by reference number 450, the base station may decode the one or more additional uplink transmissions based at least in part on the second values. In some aspects, the base station may decode the one or more additional uplink transmissions based at least in part on the second values based at least in part on receiving the indication that the second values are to be used for the set of transmission parameters. In some aspects, the base station may decode the one or more additional uplink transmissions based at least in part on the second values after failing to decode the uplink transmission based at least in part on the first values and/or successfully decoding the uplink transmission based at least in part on the second values.

In some aspects, the base station may attempt to decode the one or more additional uplink transmissions based at least in part on the second values for a period of time, and then may revert back to attempting to decode uplink transmissions based at least in part on the first values. In some aspects, the base station may attempt to decode the one or more additional uplink transmissions based at least in part on the second values until the UE or the base station transmits an indication to deactivate the indication that the second values are to be used for the set of transmission parameters.

As shown by reference number 455, the UE may provide an indication to deactivate use of the second values. In other words, the UE may transmit an indication to deactivate the indication that the second values are to be used for the set of transmission parameters. In some aspects, the UE may receive (e.g., from the base station), an indication to deactivate use of the second values and/or the UE may transmit an acknowledgement associated with indication to deactivate use of the second values.

Based at least in part on the UE transmitting the uplink transmission and/or the one or more additional transmissions using the second values in place of the first values (e.g., with the first values determined based at least in part on an absence of the MPE event), the UE may transmit the uplink transmission with values for the transmission parameters that may increase a likelihood of reception by the base station. In this way, the UE and the base station may conserve computing, communication, and/or network resources that may otherwise be used to detect and recover from failure of the uplink transmission and/or the one or more additional uplink transmissions.

As indicated above, FIG. 4 is provided as an example. Other examples may differ from what is described with respect to FIG. 4.

Figure 5:
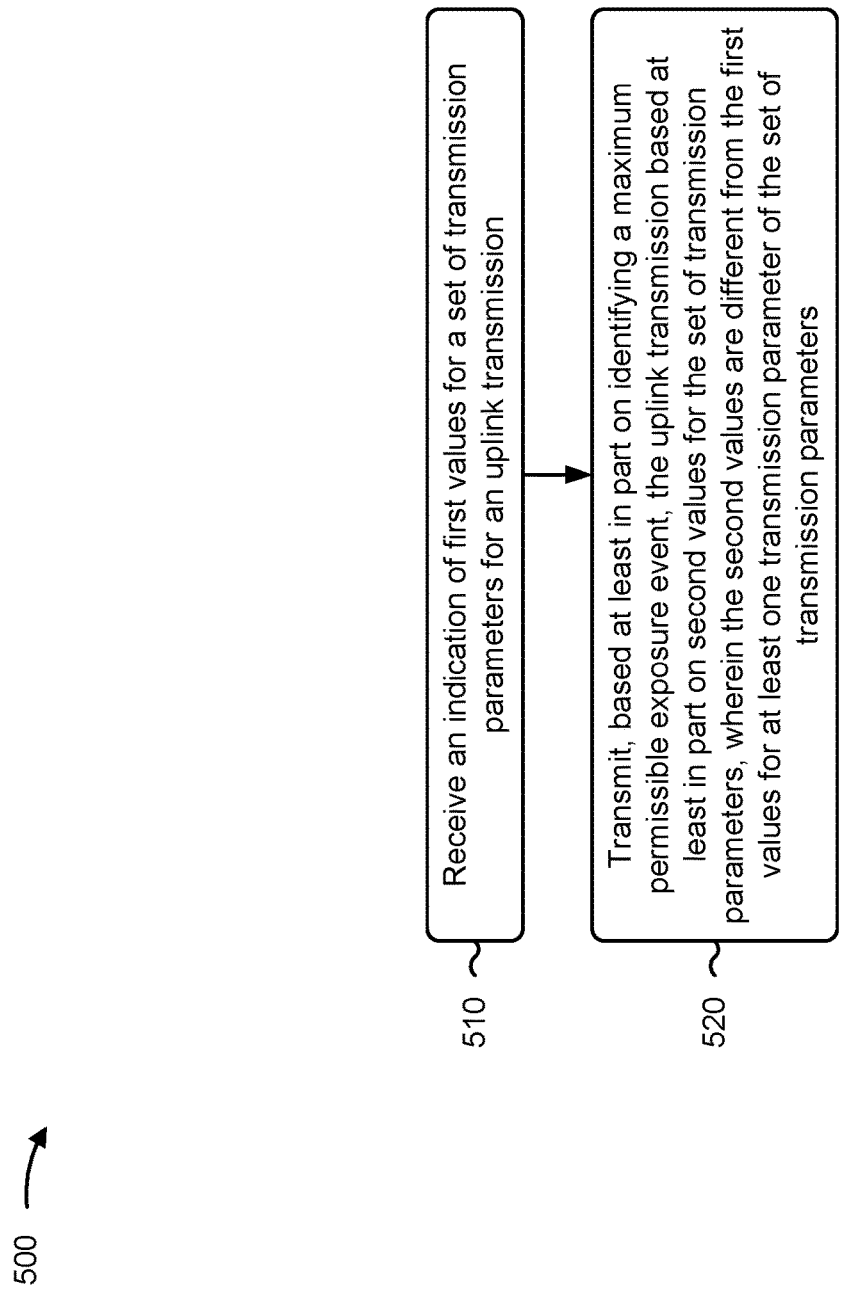
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with selection of transmission parameters for an MPE event.

As shown in FIG. 5, in some aspects, process 500 may include receiving an indication of first values for a set of transmission parameters for an uplink transmission (block 510). For example, the UE (e.g., using receive processor 258, controller/processor 280, memory 282, and/or the like) may receive an indication of first values for a set of transmission parameters for an uplink transmission, as described above.

As further shown in FIG. 5, in some aspects, process 500 may include transmitting, based at least in part on identifying an MPE event, the uplink transmission based at least in part on second values for the set of transmission parameters, wherein the second values are different from the first values for at least one modulation parameter of the set of transmission parameters (block 520). For example, the UE (e.g., using transmit processor 264, controller/processor 280, memory 282, and/or the like) may transmit, based at least in part on identifying an MPE event, the uplink transmission based at least in part on second values for the set of transmission parameters, as described above. In some aspects, the second values are different from the first values for at least one modulation parameter of the set of transmission parameters.

Process 500 may include additional aspects, such as any single aspect or any combination of aspects described below and/or in connection with one or more other processes described elsewhere herein.

In a first aspect, the set of transmission parameters comprises one or more of: an MCS for the uplink transmission, a DMRS pattern for the uplink transmission, a DMRS bundling configuration for the uplink transmission, a slot aggregation configuration for the uplink transmission, time and frequency allocations of resources for the uplink transmission, or instantaneous power for the uplink transmission.

In a second aspect, alone or in combination with the first aspect, process 500 includes reducing a transmission power for the uplink transmission based at least in part on the MPE event.

In a third aspect, alone or in combination with one or more of the first and second aspects, process 500 includes receiving an indication to use the second values for the set of transmission parameters based at least in part on identifying an MPE event.

In a fourth aspect, alone or in combination with one or more of the first through third aspects, receiving the indication to use the second values for the set of transmission parameters based at least in part on identifying an MPE event includes receiving, via RRC signaling and separately from the indication of the first values for the set of transmission parameters for the uplink transmission, the indication to use the second values for the set of transmission parameters based at least in part on identifying an MPE event.

In a fifth aspect, alone or in combination with one or more of the first through fourth aspects, receiving the indication of the first values for the set of transmission parameters for the uplink transmission includes receiving, via a single message, the indication of the first values and the indication to use the second values for the set of transmission parameters based at least in part on identifying an MPE event.

In a sixth aspect, alone or in combination with one or more of the first through fifth aspects, process 500 includes providing, to a base station, an indication that the second values are to be used for the set of transmission parameters for the uplink transmission.

In a seventh aspect, alone or in combination with one or more of the first through sixth aspects, providing the indication that the second values are to be used for the set of transmission parameters includes transmitting the indication that the second values are to be used for the set of transmission parameters via one or more of a UCI message via a PUCCH, a UCI message via a PUSCH, a MAC CE, or a power headroom report.

In an eighth aspect, alone or in combination with one or more of the first through seventh aspects, the indication that the second values are to be used for the set of transmission parameters is deactivated based at least in part on one or more of expiration of a configured amount of time, or transmission of an indication to deactivate the indication that the second values are to be used for the set of transmission parameters.

In a ninth aspect, alone or in combination with one or more of the first through eighth aspects, process 500 includes receiving a request to provide the indication that the second values are to be used for the set of transmission parameters, wherein providing the indication that the second values are to be used for the set of transmission parameters is based at least in part on the request.

In a tenth aspect, alone or in combination with one or more of the first through ninth aspects, the uplink transmission is scheduled as part of a configured grant.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
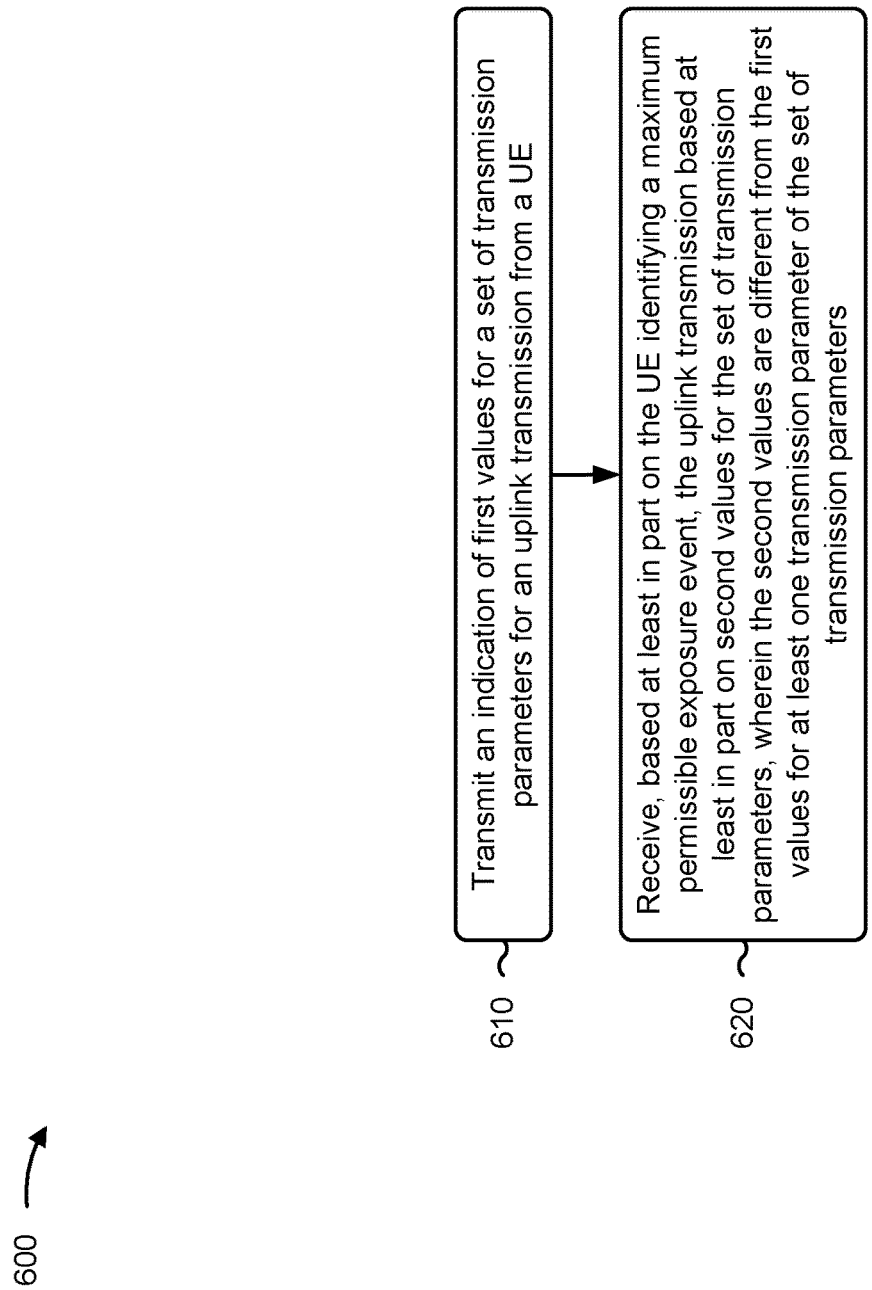
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 and/or the like) performs operations associated with selection of transmission parameters for an MPE event.

As shown in FIG. 6, in some aspects, process 600 may include transmitting an indication of first values for a set of transmission parameters for an uplink transmission from a UE (block 610). For example, the base station (e.g., using transmit processor 220, controller/processor 240, memory 242, and/or the like) may transmit an indication of first values for a set of transmission parameters for an uplink transmission from a UE, as described above.

As further shown in FIG. 6, in some aspects, process 600 may include receiving, based at least in part on the UE identifying an MPE event, the uplink transmission based at least in part on second values for the set of transmission parameters, wherein the second values are different from the first values for at least one modulation parameter of the set of transmission parameters (block 620). For example, the base station (e.g., using receive processor 238, controller/processor 240, memory 242, and/or the like) may receive, based at least in part on the UE identifying an MPE event, the uplink transmission based at least in part on second values for the set of transmission parameters, as described above. In some aspects, the second values are different from the first values for at least one modulation parameter of the set of transmission parameters.

Process 600 may include additional aspects, such as any single aspect or any combination of aspects described below and/or in connection with one or more other processes described elsewhere herein.

In a first aspect, the set of transmission parameters comprises one or more of: an MCS for the uplink transmission, a DMRS pattern for the uplink transmission, a DMRS bundling configuration for the uplink transmission, a slot aggregation configuration for the uplink transmission, time and frequency allocations of resources for the uplink transmission, or instantaneous power for the uplink transmission.

In a second aspect, alone or in combination with the first aspect, a transmission power for the uplink transmission is reduced based at least in part on the UE identifying the MPE event.

In a third aspect, alone or in combination with one or more of the first and second aspects, process 600 includes transmitting an indication to use the second values for the set of transmission parameters based at least in part on identifying an MPE event.

In a fourth aspect, alone or in combination with one or more of the first through third aspects, transmitting the indication to use the second values for the set of transmission parameters based at least in part on identifying an MPE event includes transmitting, via RRC signaling and separately from the indication of the first values for the set of transmission parameters for the uplink transmission, the indication to use the second values for the set of transmission parameters based at least in part on the UE identifying an MPE event.

In a fifth aspect, alone or in combination with one or more of the first through fourth aspects, transmitting the indication of the first values for the set of transmission parameters for the uplink transmission includes transmitting, via a single message, the indication of the first values and the indication to use the second values for the set of transmission parameters based at least in part on the UE identifying an MPE event.

In a sixth aspect, alone or in combination with one or more of the first through fifth aspects, process 600 includes receiving an indication that the second values are to be used for the set of transmission parameters for the uplink transmission.

In a seventh aspect, alone or in combination with one or more of the first through sixth aspects, receiving the indication that the second values are to be used for the set of transmission parameters includes receiving the indication that the second values are to be used for the set of transmission parameters via one or more of a UCI message via a PUCCH, a UCI message via a PUSCH, a MAC CE, or a power headroom report.

In an eighth aspect, alone or in combination with one or more of the first through seventh aspects, the indication that the second values are to be used for the set of transmission parameters is deactivated based at least in part on one or more of expiration of a configured amount of time, or reception of an indication to deactivate the indication that the second values are to be used for the set of transmission parameters.

In a ninth aspect, alone or in combination with one or more of the first through eighth aspects, process 600 includes transmitting a request to provide the indication that the second values are to be used for the set of transmission parameters, wherein providing the indication that the second values are to be used for the set of transmission parameters is based at least in part on the request.

In a tenth aspect, alone or in combination with one or more of the first through ninth aspects, process 600 includes scheduling the uplink transmission as part of a configured grant.

In an eleventh aspect, alone or in combination with one or more of the first through tenth aspects, process 600 includes attempting to decode the uplink transmission using the first values, attempting to decode the uplink transmission using the second values, and determining that the second values were used for the uplink transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving an indication of first values for a set of transmission parameters for an uplink transmission; and transmitting, based at least in part on identifying a maximum permissible exposure event, the uplink transmission based at least in part on second values for the set of transmission parameters, wherein the second values are different from the first values for at least one modulation parameter of the set of transmission parameters.

Aspect 2: The method of Aspect 1, wherein the set of transmission parameters comprises one or more of: a modulation and coding scheme for the uplink transmission, a DMRS pattern for the uplink transmission, a demodulation reference signal bundling configuration for the uplink transmission, a slot aggregation configuration for the uplink transmission, time and frequency allocations of resources for the uplink transmission, or instantaneous power for the uplink transmission.

Aspect 3: The method of any of Aspects 1-2, further comprising: reducing a transmission power for the uplink transmission based at least in part on the maximum permissible exposure event.

Aspect 4: The method of any of Aspects 1-2, further comprising: receiving an indication to use the second values for the set of transmission parameters based at least in part on identifying a maximum permissible exposure event.

Aspect 5: The method of Aspect 4, wherein receiving the indication to use the second values for the set of transmission parameters based at least in part on identifying a maximum permissible exposure event comprises: receiving, via radio resource control signaling and separately from the indication of the first values for the set of transmission parameters for the uplink transmission, the indication to use the second values for the set of transmission parameters based at least in part on identifying a maximum permissible exposure event.

Aspect 6: The method of Aspect 4, wherein receiving the indication of the first values for the set of transmission parameters for the uplink transmission comprises: receiving, via a single message, the indication of the first values and the indication to use the second values for the set of transmission parameters based at least in part on identifying a maximum permissible exposure event.

Aspect 7: The method of any of Aspects 1-6, further comprising: providing, to a base station, an indication that the second values are to be used for the set of transmission parameters for the uplink transmission.

Aspect 8: The method of Aspect 7, wherein providing the indication that the second values are to be used for the set of transmission parameters comprises: transmitting the indication that the second values are to be used for the set of transmission parameters via one or more of: an uplink control information message via a physical uplink control channel, an uplink control information message via a physical uplink shared channel, a medium access control control element, or a power headroom report.

Aspect 9: The method of Aspect 7, wherein the indication that the second values are to be used for the set of transmission parameters is deactivated based at least in part on one or more of: expiration of a configured amount of time, or transmission of an indication to deactivate the indication that the second values are to be used for the set of transmission parameters.

Aspect 10: The method of Aspect 7, further comprising: receiving a request to provide the indication that the second values are to be used for the set of transmission parameters, wherein providing the indication that the second values are to be used for the set of transmission parameters is based at least in part on the request.

Aspect 11: The method of any of Aspects 1-10, wherein the uplink transmission is scheduled as part of a configured grant.

Aspect 12: A method of wireless communication performed by a base station, comprising: transmitting an indication of first values for a set of transmission parameters for an uplink transmission from a user equipment (UE); and receiving, based at least in part on the UE identifying a maximum permissible exposure event, the uplink transmission based at least in part on second values for the set of transmission parameters, wherein the second values are different from the first values for at least one modulation parameter of the set of transmission parameters.

Aspect 13: The method of Aspect 12, wherein the set of transmission parameters comprises one or more of: a modulation and coding scheme for the uplink transmission, a DMRS pattern for the uplink transmission, a demodulation reference signal bundling configuration for the uplink transmission, a slot aggregation configuration for the uplink transmission, time and frequency allocations of resources for the uplink transmission, or instantaneous power for the uplink transmission.

Aspect 14: The method of any of Aspects 12-13, wherein a transmission power for the uplink transmission is reduced based at least in part on the UE identifying the maximum permissible exposure event.

Aspect 15: The method of any of Aspects 12-14, further comprising: transmitting an indication to use the second values for the set of transmission parameters based at least in part on identifying a maximum permissible exposure event.

Aspect 16: The method of Aspect 15, wherein transmitting the indication to use the second values for the set of transmission parameters based at least in part on identifying a maximum permissible exposure event comprises: transmitting, via radio resource control signaling and separately from the indication of the first values for the set of transmission parameters for the uplink transmission, the indication to use the second values for the set of transmission parameters based at least in part on the UE identifying a maximum permissible exposure event.

Aspect 17: The method of Aspect 15, wherein transmitting the indication of the first values for the set of transmission parameters for the uplink transmission comprises: transmitting, via a single message, the indication of the first values and the indication to use the second values for the set of transmission parameters based at least in part on the UE identifying a maximum permissible exposure event.

Aspect 18: The method of any of Aspects 12-17, further comprising: receiving an indication that the second values are to be used for the set of transmission parameters for the uplink transmission.

Aspect 19: The method of Aspect 18, wherein receiving the indication that the second values are to be used for the set of transmission parameters comprises: receiving the indication that the second values are to be used for the set of transmission parameters via one or more of: an uplink control information message via a physical uplink control channel, an uplink control information message via a physical uplink shared channel, a medium access control control element, or a power headroom report.

Aspect 20: The method of Aspect 18, wherein the indication that the second values are to be used for the set of transmission parameters is deactivated based at least in part on one or more of: expiration of a configured amount of time, or reception of an indication to deactivate the indication that the second values are to be used for the set of transmission parameters.

Aspect 21: The method of Aspect 18, further comprising: transmitting a request to provide the indication that the second values are to be used for the set of transmission parameters, wherein providing the indication that the second values are to be used for the set of transmission parameters is based at least in part on the request.

Aspect 22: The method of any of Aspects 12-21, further comprising: scheduling the uplink transmission as part of a configured grant.

Aspect 23: The method of any of Aspects 12-22, further comprising: attempting to decode the uplink transmission using the first values; attempting to decode the uplink transmission using the second values; and determining that the second values were used for the uplink transmission.

Aspect 24: An apparatus for wireless communication at a device, comprising a processor; memory coupled with the processor; and instructions stored in the memory and executable by the processor to cause the apparatus to perform the method of one or more Aspects of Aspects 1-23.

Aspect 25: A device for wireless communication, comprising a memory and one or more processors coupled to the memory, the memory and the one or more processors configured to perform the method of one or more Aspects of Aspects 1-23.

Aspect 26: An apparatus for wireless communication, comprising at least one means for performing the method of one or more Aspects of Aspects 1-23.

Aspect 27: A non-transitory computer-readable medium storing code for wireless communication, the code comprising instructions executable by a processor to perform the method of one or more Aspects of Aspects 1-23.

Aspect 28: A non-transitory computer-readable medium storing a set of instructions for wireless communication, the set of instructions comprising one or more instructions that, when executed by one or more processors of a device, cause the device to perform the method of one or more Aspects of Aspects 1-23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an indication of first values for a set of transmission parameters for an uplink transmission;
   reducing a transmission power for the uplink transmission based at least in part on identifying a maximum permissible exposure event; and
   transmitting the uplink transmission using the reduced transmission power and using second values for the set of transmission parameters based at least in part on a determination of whether the reduced transmission power is sufficient for a device to receive the uplink transmission, wherein the second values are different from the first values for at least one modulation parameter of the set of transmission parameters.

2. The method of claim 1, wherein the set of transmission parameters comprises one or more of:
   a modulation and coding scheme for the uplink transmission,
   a demodulation reference signal (DMRS) pattern for the uplink transmission,
   a DMRS bundling configuration for the uplink transmission,
   a slot aggregation configuration for the uplink transmission,
   time and frequency allocations of resources for the uplink transmission, or
   instantaneous power for the uplink transmission.

3. The method of claim 1, further comprising:
   receiving an indication to use the second values for the set of transmission parameters based at least in part on identifying a maximum permissible exposure event.

4. The method of claim 3, wherein receiving the indication to use the second values for the set of transmission parameters based at least in part on identifying a maximum permissible exposure event comprises:
receiving, via radio resource control signaling and separately from the indication of the first values for the set of transmission parameters for the uplink transmission, the indication to use the second values for the set of transmission parameters based at least in part on identifying a maximum permissible exposure event.

5. The method of claim 3, wherein receiving the indication of the first values for the set of transmission parameters for the uplink transmission comprises:
receiving, via a single message, the indication of the first values and the indication to use the second values for the set of transmission parameters based at least in part on identifying a maximum permissible exposure event.

6. The method of claim 1, further comprising:
providing, to a base station, an indication that the second values are to be used for the set of transmission parameters for the uplink transmission.

7. The method of claim 6, wherein providing the indication that the second values are to be used for the set of transmission parameters comprises:
transmitting the indication that the second values are to be used for the set of transmission parameters via one or more of:
an uplink control information message via a physical uplink control channel,
an uplink control information message via a physical uplink shared channel,
a medium access control control element, or
a power headroom report.

8. The method of claim 6, wherein the indication that the second values are to be used for the set of transmission parameters is deactivated based at least in part on one or more of:
expiration of a configured amount of time, or
transmission of an indication to deactivate the indication that the second values are to be used for the set of transmission parameters.

9. The method of claim 6, further comprising:
receiving a request to provide the indication that the second values are to be used for the set of transmission parameters,
wherein providing the indication that the second values are to be used for the set of transmission parameters is based at least in part on the request.

10. The method of claim 1, wherein the uplink transmission is scheduled as part of a configured grant.

11. A user equipment (UE) for wireless communication, comprising:
a memory; and
one or more processors, coupled to the memory, configured to:
receive an indication of first values for a set of transmission parameters for an uplink transmission;
reduce a transmission power for the uplink transmission based at least in part on identifying a maximum permissible exposure event; and
transmit the uplink transmission using the reduced transmission power and using second values for the set of transmission parameters based at least in part on a determination of whether the reduced transmission power is sufficient for a device to receive the uplink transmission, wherein the second values are different from the first values for at least one modulation parameter of the set of transmission parameters.

12. The UE of claim 11, wherein the set of transmission parameters comprises one or more of:
a modulation and coding scheme for the uplink transmission,
a demodulation reference signal (DMRS) pattern for the uplink transmission,
a DMRS bundling configuration for the uplink transmission,
a slot aggregation configuration for the uplink transmission,
time and frequency allocations of resources for the uplink transmission, or
instantaneous power for the uplink transmission.

13. The UE of claim 11, wherein the one or more processors are further configured to:
receive an indication to use the second values for the set of transmission parameters based at least in part on identifying a maximum permissible exposure event.

14. The UE of claim 13, wherein the one or more processors, to receive the indication to use the second values for the set of transmission parameters based at least in part on identifying a maximum permissible exposure event, are configured to:
receive, via radio resource control signaling and separately from the indication of the first values for the set of transmission parameters for the uplink transmission, the indication to use the second values for the set of transmission parameters based at least in part on identifying a maximum permissible exposure event.

15. The UE of claim 13, wherein the one or more processors, to receive the indication of the first values for the set of transmission parameters for the uplink transmission, are configured to:
receive, via a single message, the indication of the first values and the indication to use the second values for the set of transmission parameters based at least in part on identifying a maximum permissible exposure event.

16. The UE of claim 11, wherein the one or more processors are further configured to:
provide, to a base station, an indication that the second values are to be used for the set of transmission parameters for the uplink transmission.

17. The UE of claim 16, wherein the one or more processors, to provide the indication that the second values are to be used for the set of transmission parameters, are configured to:
transmit the indication that the second values are to be used for the set of transmission parameters via one or more of:
an uplink control information message via a physical uplink control channel,
an uplink control information message via a physical uplink shared channel,
a medium access control control element, or
a power headroom report.

18. The UE of claim 16, wherein the indication that the second values are to be used for the set of transmission parameters is deactivated based at least in part on one or more of:
expiration of a configured amount of time, or
transmission of an indication to deactivate the indication that the second values are to be used for the set of transmission parameters.

19. The UE of claim 16, wherein the one or more processors are further configured to:
receive a request to provide the indication that the second values are to be used for the set of transmission parameters,
wherein providing the indication that the second values are to be used for the set of transmission parameters is based at least in part on the request.

20. The UE of claim 11, wherein the uplink transmission is scheduled as part of a configured grant.

21. A non-transitory computer-readable medium storing a set of instructions for wireless communication, the set of instructions comprising:
one or more instructions that, when executed by one or more processors of a user equipment (UE), cause the UE to:
receive an indication of first values for a set of transmission parameters for an uplink transmission;
reduce a transmission power for the uplink transmission based at least in part on identifying a maximum permissible exposure event; and
transmit the uplink transmission using the reduced transmission power and using second values for the set of transmission parameters based at least in part on a determination of whether the reduced transmission power is sufficient for a device to receive the uplink transmission, wherein the second values are different from the first values for at least one modulation parameter of the set of transmission parameters.

22. The non-transitory computer-readable medium of claim 21, wherein the set of transmission parameters comprises one or more of:
a modulation and coding scheme for the uplink transmission,
a demodulation reference signal (DMRS) pattern for the uplink transmission,
a DMRS bundling configuration for the uplink transmission,
a slot aggregation configuration for the uplink transmission,
time and frequency allocations of resources for the uplink transmission, or
instantaneous power for the uplink transmission.

23. The non-transitory computer-readable medium of claim 21, wherein the one or more instructions further cause the UE to:
receive an indication to use the second values for the set of transmission parameters based at least in part on identifying a maximum permissible exposure event.

24. The non-transitory computer-readable medium of claim 23, wherein the one or more instructions to receive the indication to use the second values for the set of transmission parameters based at least in part on identifying a maximum permissible exposure event further cause the UE to:
receive, via radio resource control signaling and separately from the indication of the first values for the set of transmission parameters for the uplink transmission, the indication to use the second values for the set of transmission parameters based at least in part on identifying a maximum permissible exposure event.

25. The non-transitory computer-readable medium of claim 23, wherein the one or more instructions to receive the indication of the first values for the set of transmission parameters for the uplink transmission further cause the UE to:
receive, via a single message, the indication of the first values and the indication to use the second values for the set of transmission parameters based at least in part on identifying a maximum permissible exposure event.

26. An apparatus for wireless communication, comprising:
means for receiving an indication of first values for a set of transmission parameters for an uplink transmission;
means for reducing a transmission power for the uplink transmission based at least in part on identifying a maximum permissible exposure event; and
means for transmitting the uplink transmission using the reduced transmission power and using second values for the set of transmission parameters based at least in part on a determination of whether the reduced transmission power is sufficient for a device to receive the uplink transmission, wherein the second values are different from the first values for at least one modulation parameter of the set of transmission parameters.

27. The apparatus of claim 26, wherein the set of transmission parameters comprises one or more of:
a modulation and coding scheme for the uplink transmission,
a demodulation reference signal (DMRS) pattern for the uplink transmission,
a DMRS bundling configuration for the uplink transmission,
a slot aggregation configuration for the uplink transmission,
time and frequency allocations of resources for the uplink transmission, or
instantaneous power for the uplink transmission.

28. The apparatus of claim 26, further comprising:
means for receiving an indication to use the second values for the set of transmission parameters based at least in part on identifying a maximum permissible exposure event.

29. The apparatus of claim 28, wherein the means for receiving the indication to use the second values for the set of transmission parameters based at least in part on identifying a maximum permissible exposure event further comprise:
means for receiving, via radio resource control signaling and separately from the indication of the first values for the set of transmission parameters for the uplink transmission, the indication to use the second values for the set of transmission parameters based at least in part on identifying a maximum permissible exposure event.

30. The apparatus of claim 28, wherein the means for receiving the indication of the first values for the set of transmission parameters for the uplink transmission further comprise:
means for receiving, via a single message, the indication of the first values and the indication to use the second values for the set of transmission parameters based at least in part on identifying a maximum permissible exposure event.

* * * * *